US012583297B2

(12) United States Patent
Choi et al.

(10) Patent No.: US 12,583,297 B2
(45) Date of Patent: Mar. 24, 2026

(54) ROOF STRUCTURE FOR VEHICLE

(71) Applicants: Hyundai Motor Company, Seoul
(KR); Kia Corporation, Seoul (KR)

(72) Inventors: SunKi Choi, Hwaseong-si (KR);
Yujeong Kim, Yongin-si (KR); **Ji Won
Chang, Seoul (KR); Inbum Lee**, Seoul
(KR)

(73) Assignees: HYUNDAI MOTOR COMPANY,
Seoul (KR); KIA CORPORATION,
Seoul (KR)

( * ) Notice: Subject to any disclaimer, the term of this
patent is extended or adjusted under 35
U.S.C. 154(b) by 377 days.

(21) Appl. No.: 18/346,562

(22) Filed: Jul. 3, 2023

(65) Prior Publication Data

US 2024/0149649 A1     May 9, 2024

(30) Foreign Application Priority Data

Nov. 3, 2022    (KR) ......................... 10-2022-0144934

(51) Int. Cl.
*B60J 7/11*          (2006.01)
*B60J 7/043*         (2006.01)
*B60R 11/02*         (2006.01)
*B60R 11/00*         (2006.01)
(52) U.S. Cl.
CPC .............. *B60J 7/11* (2013.01); *B60J 7/0435*
(2013.01); *B60R 11/02* (2013.01); *B60R*

*2011/0028* (2013.01); *B60R 2011/0084*
(2013.01); *B60R 2011/0085* (2013.01)
(58) Field of Classification Search
CPC ......... B60J 7/11; B60J 7/00; B60J 7/08; B60J
10/82; B60R 11/02; B60R 2011/0028;
B60R 2011/0042; B60R 2011/008; B60R
2011/0084; B60R 2011/0085
USPC ................... 296/218; 362/488, 490; 248/237
See application file for complete search history.

(56) References Cited

U.S. PATENT DOCUMENTS

| | | | | |
|---|---|---|---|---|
| 4,601,511 A | * | 7/1986 | Nakamura | B62D 25/06 |
| | | | | 296/210 |
| 4,767,154 A | * | 8/1988 | Okamoto | B60J 7/106 |
| | | | | 296/210 |
| 6,877,796 B2 | * | 4/2005 | Kimura | B60J 7/022 |
| | | | | 296/210 |

* cited by examiner

*Primary Examiner* — Dennis H Pedder
(74) *Attorney, Agent, or Firm* — SLATER MATSIL, LLP

(57) ABSTRACT

An embodiment roof structure for a vehicle includes a roof
rail assembly configured to be connected to side structures
disposed on both sides of a vehicle body, the roof rail
assembly including an opening defined therein, a removable
roof panel detachably provided in a first section of an area
of the roof rail assembly, the first section including an edge
region of the opening, and a fixed roof panel connected to a
second section of the area, the second section being outside
the first section.

19 Claims, 12 Drawing Sheets

100

<u>100</u>

ROOF STRUCTURE FOR VEHICLE

CROSS-REFERENCE TO RELATED APPLICATIONS

This application claims the benefit of Korean Patent Application No. 10-2022-0144934, filed on Nov. 3, 2022, which application is hereby incorporated herein by reference.

TECHNICAL FIELD

The present invention relates to a vehicle body.

BACKGROUND

In general, a vehicle body may consist of a plurality of vehicle body members and a plurality of vehicle body panels. The vehicle body is designed to meet the conditions required in each part (e.g., strength, durability, etc.).

In some cases, a sunroof module is applied to the roof structure of the vehicle body to provide an open feeling of the interior to the occupants.

On the other hand, in the vehicle industry, as a solution for increasing the marketability of vehicles, there are cases where user experience (UX) products such as monitors are mounted on the roof structure of the vehicle interior.

However, in the case of mounting the sunroof module and the UX product on the roof structure of the vehicle body, various conveniences can be provided to the occupants, but it is disadvantageous in terms of manufacturing cost, and it is difficult to secure the ceiling strength of the roof structure and the skeletal strength of the vehicle body.

Matters described in this background section are prepared to enhance understanding of the background of embodiments of the invention and may include matters other than conventional art already known to a person of an ordinary skill in the field to which this art belongs.

SUMMARY

The present invention relates to a vehicle body. Particular embodiments relate to a roof structure of a vehicle body.

Embodiments of the present disclosure provide a roof structure of a vehicle capable of opening and closing the roof with a simple configuration, using UX products, and securing roof strength while enhancing cross-section connectivity and bonding strength.

A roof structure of a vehicle according to an exemplary embodiment of the present invention may include a roof rail assembly connected to side structures disposed on both sides of the vehicle body and having an opening formed therein, a removable roof panel detachably provided in a first section formed in an edge region of the opening, and a fixed roof panel connected to a second section of an area other than the first section.

The roof rail assembly may include a concave forming part formed in the second section.

The second section may be connected with the fixed roof panel by welding.

A first closed cross-section may be formed between the concave forming part and the fixed roof panel.

The removable roof panel may include a lower panel provided to engage with the first section and an upper panel connected by welding to the lower panel to form a second closed cross-section.

The lower panel may be provided with a weld nut.

The weld nut may engage with an engage bolt that penetrates the first section.

The roof rail assembly may include a pair of transverse direction rail bodies connected to the side structure along the vehicle width direction and a pair of longitudinal direction rail bodies connected to the pair of transverse direction rail bodies along the front to rear direction of the vehicle body.

The roof rail assembly may form the opening between the pair of transverse direction rail bodies and the pair of longitudinal direction rail bodies.

A guide rail portion may be formed in the roof rail assembly along a predetermined section.

A rail slot may be formed in the guide rail portion.

A pair of bearing assemblies that slide through the rail slot may be installed on the guide rail portion.

A link member may be rotatably connected to the pair of bearing assemblies, respectively.

The link member may include a pair of link slots spaced apart from each other along the length direction so that the pair of bearing assemblies move in a slidable manner.

The guide rail portion and the rail slot may be formed in any one of the front and rear portions of the roof rail assembly along the front to rear direction of the vehicle body.

The link member may be equipped with a UX product.

The roof structure according to an exemplary embodiment of the present invention may further include a sealing member connected to an edge portion of the removable roof panel to seal between the removable roof panel and the fixed roof panel.

According to the exemplary embodiments of the present invention, it is possible to improve the marketability of a vehicle, reduce manufacturing cost, and secure ceiling strength and skeletal strength of a vehicle body while enhancing cross-section connectivity and bonding strength.

In addition, the effects that can be obtained or predicted due to the embodiments of the present invention will be directly or implicitly disclosed in the detailed description of the embodiments of the present invention. That is, various effects expected according to an embodiment of the present invention will be disclosed within the detailed description to be described later.

BRIEF DESCRIPTION OF THE DRAWINGS

Since these drawings are for reference in explaining exemplary embodiments of the present invention, the technical idea of the present invention should not be construed as limited to the accompanying drawings.

Figure 1:
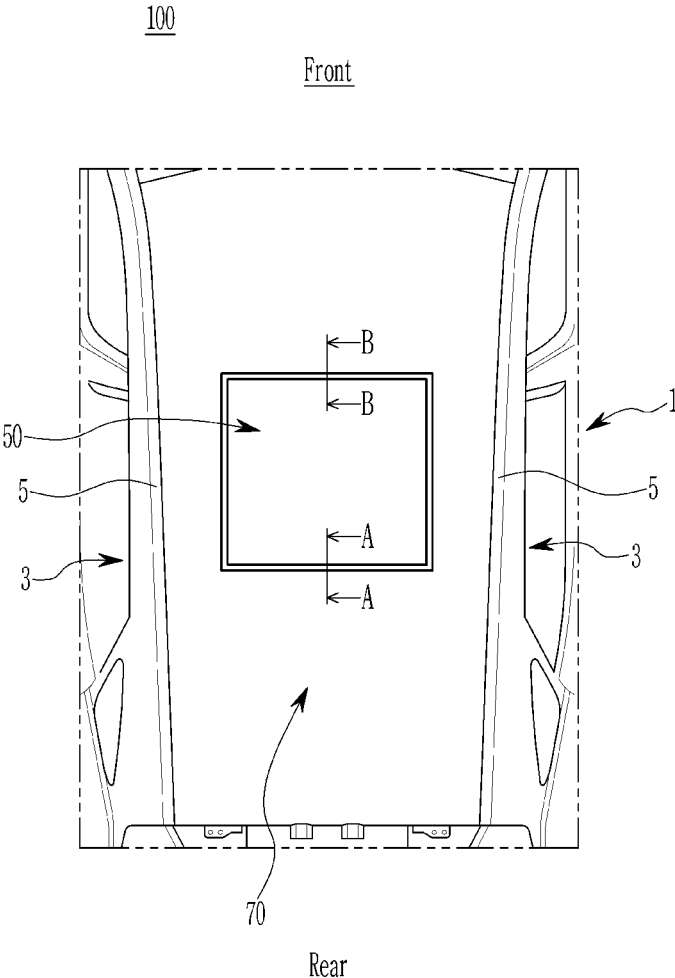
FIG. 1 is a top plan view showing a roof structure for a vehicle according to an exemplary embodiment.

The following reference identifiers may be used in connection with the drawings to describe features of embodiments of the present invention.

| | |
|---|---|
| 1: vehicle body | 3: side structure |
| 5: roof side | 10: roof rail assembly |
| 11: transverse direction rail body | 13: longitudinal direction rail body |
| 15: opening | 21: first section |
| 22: second section | 31: concave forming part |
| 33: first closed cross-section | 35: guide rail |
| 37: rail slot | 50: removable roof panel |
| 51: lower panel | 53: upper panel |
| 55: second closed cross-section | 57: weld nut |
| 59: engage bolt | 60: bearing assembly |
| 61: bearing | 63: link pin |
| 70: fixed roof panel | 71: junction flange |
| 80: link member | 81: link slot |
| 85: UX product | 90: sealing member |
| 91: weather strip | J1, J2: bolting joint |
| W1, W2: welding joint | 100: roof structure |

The drawings referenced above are not necessarily drawn to scale, but should be understood as presenting rather simplified representations of various preferred features illustrating the basic principles of embodiments of the present invention. For example, specific design features of embodiments of the present invention, including specific dimensions, direction, position, and shape, will be determined in part by specific intended applications and use environments.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing specific exemplary embodiments only and is not intended to limit the embodiments of the present disclosure. As used herein, the singular forms are intended to include the plural forms as well, unless the context clearly indicates otherwise.

The terms 'comprises' and/or 'comprising' as used herein indicate the presence of specified features, integers, steps, operations, elements, and/or components, but they do not exclude the presence or addition of one or more other features, integers, steps, operations, elements, components, and/or groups thereof.

As used in this specification, the term 'and/or' includes any one or all combinations of at least one of the associated listed items. In this specification, the term 'connected' indicates a physical relationship between two components, for example, a relationship in which components are directly connected to each other by welding, self piercing rivet (SPR), flow drill screw (FDS), structural adhesive, or the like, or a relationship in which components are indirectly connected through one or more intermediate components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based purpose built vehicles (PBVs), hydrogen-powered vehicles, and other alternative fuel vehicles (e.g., other than petroleum fuel derived from resources).

Hereinafter, embodiments of the present invention will be described in detail with reference to the accompanying drawings.

FIG. 1 is a top plan view showing a roof structure for a vehicle according to an exemplary embodiment.

Referring to FIG. 1, a roof structure 100 for a vehicle according to an exemplary embodiment may be applied to a vehicle body 1 of a passenger vehicle and/or a sports utility vehicle, for example.

The vehicle roof structure 100 according to an exemplary embodiment may be applied to the vehicle body 1 of a purpose-based mobility vehicle (PBV), which is one of the new concept future mobility solutions for realizing a human-centered dynamic future city.

In this specification, the 'front-to-rear direction of the vehicle body' may be defined as the longitudinal direction of the vehicle body, the 'vehicle width direction' may be defined as the left-right direction of the vehicle body, and the 'up-and-down direction' may be defined as the height direction of the vehicle body.

Furthermore, in this specification, 'upper end', 'upper portion', or 'upper surface' of a component indicates an end, portion, or surface of a component that is relatively upper in the drawing, and 'lower end', ' lower portion', or ' lower surface' of a component indicates an end, portion, or surface of a component that is relatively lower in the drawing.

Furthermore, in this specification, an end of a component (e.g., one end or another (other) end, etc.) denotes an end of a component in any one direction, and an end portion of the component (e.g., one end portion or other (another) end portion, etc.) denotes a portion of a component that includes that end.

As described above, the vehicle body 1 includes side structures 3 provided on both sides along the vehicle width direction and the roof structure 100 for a vehicle connected to an upper portion of the side structures 3.

The roof structure 100 for a vehicle according to an exemplary embodiment may be mounted on a roof side 5 of the side structure 3 disposed along the front to rear direction of the vehicle body.

The roof structure 100 for a vehicle according to an exemplary embodiment may be a structure that can open and close the roof with a simple configuration that reduces manufacturing costs and uses a UX product.

In addition, in an exemplary embodiment, the roof structure 100 for a vehicle capable of securing roof strength while enhancing cross-section connectivity and bonding strength is provided.

Figure 2:
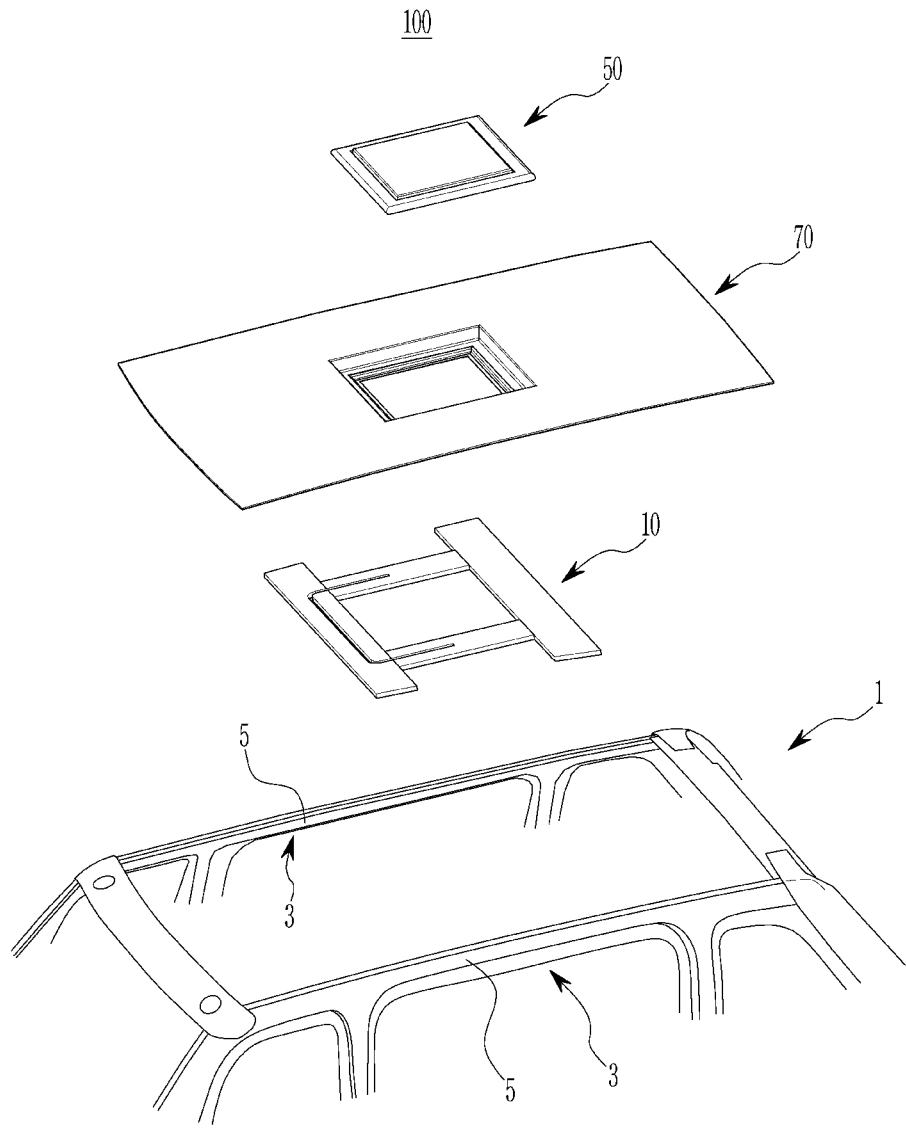
FIG. 2 is an exploded perspective view showing a roof structure for a vehicle according to an exemplary embodiment.

FIG. 2 is an exploded perspective view showing a roof structure for a vehicle according to an exemplary embodiment.

Referring to FIG. 1 and FIG. 2, the roof structure 100 for a vehicle according to an exemplary embodiment includes at least one roof rail assembly 10, a removable roof panel 50, and a fixed roof panel 70.

In an exemplary embodiment, the at least one roof rail assembly 10 is connected to the roof side 5 of the side structure 3 disposed on both sides of the vehicle body 1, respectively. In one example, the roof rail assembly 10 may be disposed in the center portion of the vehicle body 1.

Figure 3:
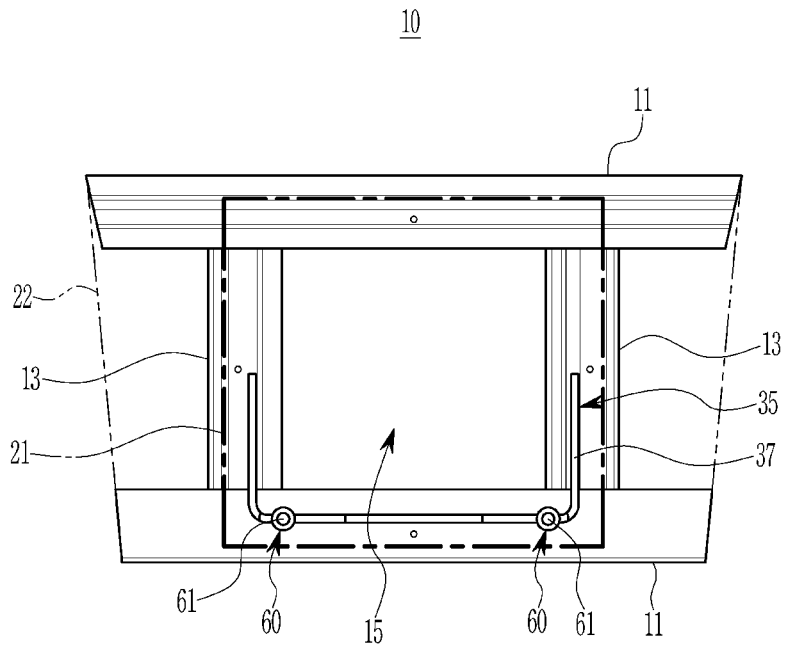
FIG. 3 is a top plan view showing a roof rail assembly applied to a roof structure for a vehicle according to an exemplary embodiment.

FIG. 3 is a top plan view showing a roof rail assembly applied to a roof structure for a vehicle according to an exemplary embodiment.

Referring to FIG. 2 and FIG. 3, the roof rail assembly 10 according to an exemplary embodiment includes a pair of transverse direction rail bodies 11 and a pair of longitudinal direction rail bodies 13.

The pair of transverse direction rail bodies 11 are disposed spaced apart from each other along the front to rear direction of the vehicle body and are connected to the roof side 5 of the side structure 3 along the vehicle width direction.

In addition, the pair of longitudinal direction rail bodies 13 are disposed spaced apart from each other along the vehicle width direction between the pair of transverse direction rail bodies 11 and are connected to the pair of transverse direction rail bodies 11 along the front to rear direction of the vehicle body.

The roof rail assembly 10 may be provided in the shape of 'Ⅱ' by combining the pair of transverse direction rail bodies 11 and the pair of longitudinal direction rail bodies 13.

The roof rail assembly 10 may include an opening 15 formed between the pair of transverse direction rail bodies 11 and the pair of longitudinal direction rail bodies 13. The opening 15 may be formed as a square-shaped opening connected to the interior of the vehicle body 1.

The roof rail assembly 10 includes a first section 21 formed with a predetermined width in the edge area of the opening 15. The roof rail assembly 10 includes a second section 22 as the remaining area except for the first section 21.

The rest of the configuration of the roof rail assembly 10 will be described along with the configuration of the removable roof panel 50 and the fixed roof panel 70 as shown below.

Referring to FIG. 1 to FIG. 3, in an exemplary embodiment, the removable roof panel 50 is adapted to selectively open and close the opening 15 of the roof rail assembly 10.

The removable roof panel 50 is detachably provided in the first section 21 of the roof rail assembly 10 in a vertical direction. The removable roof panel 50 may be mounted (e.g., coupled or engaged) to the first section 21 to close the opening 15 or separated from the first section 21 to open the opening 15.

Figure 4:
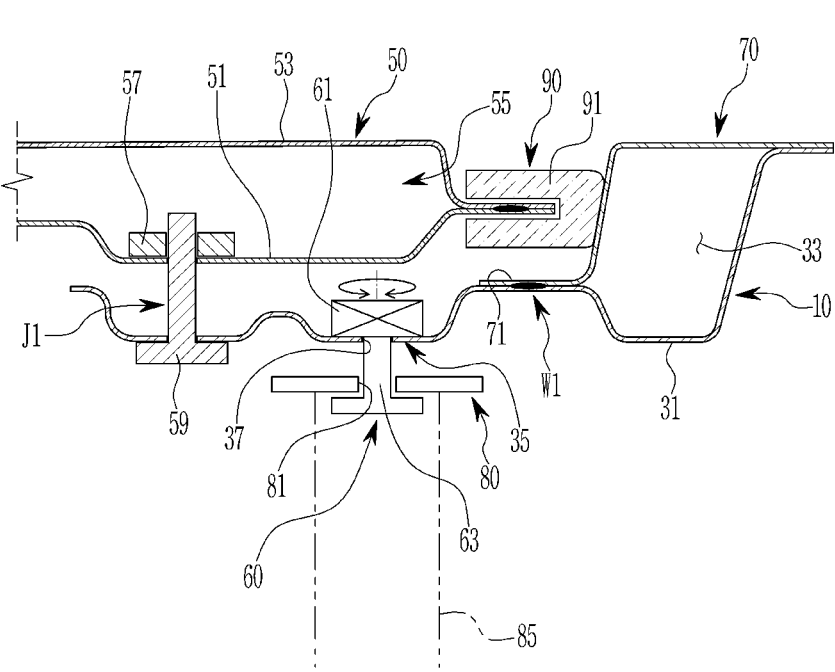
FIG. 4 is a cross-sectional view along line A-A in FIG. 1.

FIG. 4 is a cross-sectional view along line A-A in FIG. 1.

Referring to FIG. 4, the removable roof panel 50 according to an exemplary embodiment includes a lower panel 51 and an upper panel 53.

The lower panel 51 is provided to be able to engage the first section 21 having the opening 15. The upper panel 53 is welded together with the lower panel 51 along the vertical direction to form a second closed cross-section 55.

At least one weld nut 57 is connected to the lower panel 51. The at least one weld nut 57 may be engaged with at least one engage bolt 59 passing through the first section 21.

The weld nut 57 may be provided in plurality along the edge portion of the lower panel 51. And, the engage bolt 59 may be provided in plural.

The removable roof panel 50 may be mounted to the first section 21 through at least one engage bolt 59 that penetrates the first section 21 inside the vehicle body 1 and engages at least one weld nut 57.

The removable roof panel 50 may be separated from the first section 21 by disengagement of the engage bolt 59.

Referring to FIG. 1 to FIG. 4, in an exemplary embodiment, the fixed roof panel 70 is connected to the roof side 5 of the side structure 3 and may be connected to the second section 22 of the roof rail assembly 10.

The fixed roof panel 70 may have a shape in which a region corresponding to the removable roof panel 50 is removed from one panel connected to the entire roof side 5.

The fixed roof panel 70 may be connected to the second section 22 by welding through a junction flange 71.

Referring to FIG. 4, the roof rail assembly 10 according to an exemplary embodiment includes at least one concave forming part 31 formed in the second section 22 at a position corresponding to the junction of the fixed roof panel 70.

The concave forming part 31 is a part concavely formed in the lower direction and is connected to the fixed roof panel 70.

A first closed cross-section 33 (e.g., closed cross-section joint) is formed between the concave forming part 31 and the fixed roof panel 70. The second section 22 described above extends to the first section 21 with the first closed cross-section 33 connecting at least one concave forming part 31 and the fixed roof panel 70.

The roof rail assembly 10 according to an exemplary embodiment includes a guide rail portion 35 and a rail slot 37 formed on the guide rail portion 35.

The guide rail portion 35 is formed in a concave shape along a predetermined section in the first section 21 of the roof rail assembly 10. The rail slot 37 is formed on the guide rail portion 35. The rail slot 37 is formed along the section of the guide rail portion 35.

As shown in FIG. 3, the guide rail portion 35 and the rail slot 37 are formed in any one of the front and rear regions of the roof rail assembly 10 in the front to rear directions of the vehicle body.

In one example, the guide rail portion 35 and the rail slot 37 may be formed in the first section 21 at the rear of the roof rail assembly 10. In another example, the guide rail portion 35 and the rail slot 37 may be formed in a 'Ụ' shape.

Figure 5:
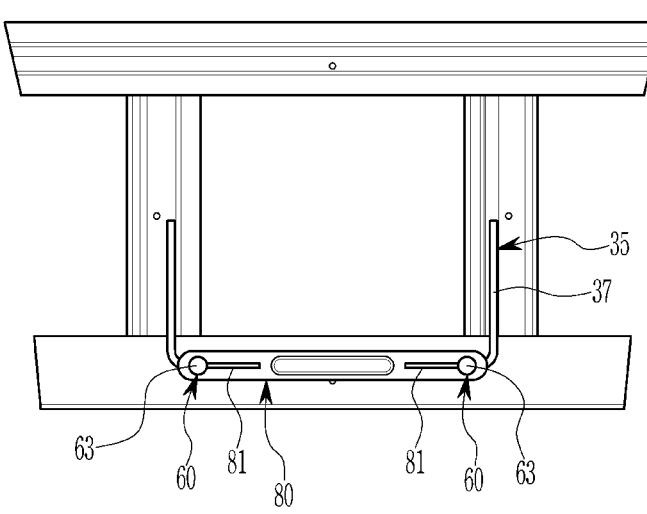
FIG. 5 is a drawing showing a bearing assembly and a link member applied to a roof structure for a vehicle according to an exemplary embodiment.

FIG. 5 is a drawing showing a bearing assembly and a link member applied to a roof structure for a vehicle according to an exemplary embodiment.

Referring to FIG. 4 and FIG. 5, the vehicle roof structure 100 according to an exemplary embodiment further includes a pair of bearing assemblies 60 and a link member 80.

The pair of bearing assemblies 60 are slidably installed along the rail slot 37 in the guide rail portion 35 of the roof rail assembly 10.

Each of the pair of bearing assemblies 60 includes a bearing 61 and a link pin 63. The bearing 61 is disposed on the guide rail portion 35 and may be rotated while contacting the guide rail portion 35. The link pin 63 is provided in a link pin shape connected to the bearing 61 and is inserted into the rail slot 37 in a vertical direction.

The link member 80 is rotatably connected to the link pin 63 of the pair of bearing assemblies 60. In one example, the link member 80 may have a rectangular plate shape.

The link member 80 includes a pair of link slots 81 spaced apart from each other along the length direction. The link pins 63 of the pair of bearing assemblies 60 are slidably coupled to each of the pair of link slots 81.

A user experience (UX) product 85 may be mounted on the link member 80. The UX product 85 may be fixed to the link member 80 or rotatably mounted to the link member 80 inside the vehicle body 1.

The UX product 85 is a user experience product that feels convenient while using information communication devices or services. In one example, it may include components such as a display device (e.g., a monitor or theater screen), a lighting device, and a hanger.

Referring to FIG. 4, the vehicle roof structure 100 according to an exemplary embodiment further includes a sealing member 90 connected to an edge portion of the removable roof panel 50.

The sealing member 90 is configured to seal between the removable roof panel 50 and the fixed roof panel 70. In one example, the sealing member 90 may include a weather strip 91 of rubber material.

In an exemplary embodiment, in the front part of the roof rail assembly 10 shown in FIG. 3, the guide rail portion 35 and the rail slot 37 shown in FIG. 4 are not provided.

As shown in FIG. 4, at the rear of the roof rail assembly 10, a bolting joint J1 of the first section 21 and the removable roof panel 50 and a welding joint W1 of the second section 22 and the fixed roof panel 70 are positioned with the guide rail portion 35 and the rail slot 37 in between.

Figure 6:
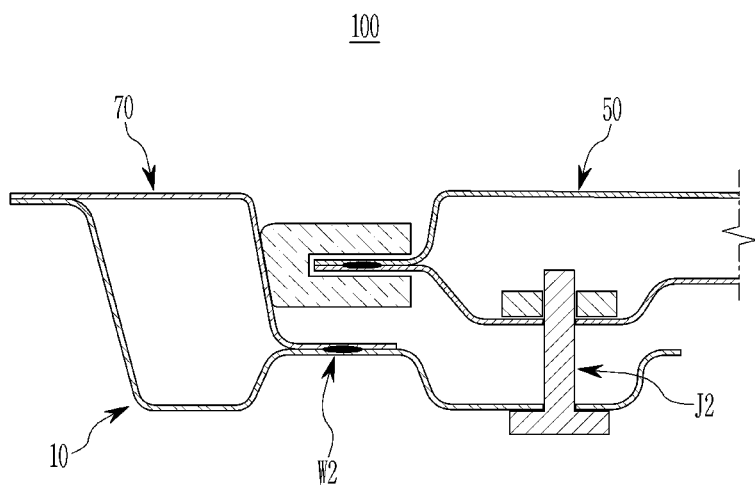
FIG. 6 is a cross-sectional view along line B-B in FIG. 1.

However, as shown in FIG. 6, in the front part of the roof rail assembly 10, a bolting joint J2 of the first section 21 and the removable roof panel 50 and a welding joint W2 of the second section 22 and the fixed roof panel 70 are positioned close to each other.

Therefore, in the vehicle roof structure 100 according to an exemplary embodiment, the cross-section of the front portion may be substantially reduced compared to the rear portion of the roof rail assembly 10.

Hereinafter, an operation of the vehicle roof structure 100 according to an exemplary embodiment described above will be described in detail referring to FIG. 1 to FIG. 9B.

Referring to FIG. 1 to FIG. 6, in an exemplary embodiment, the roof rail assembly 10 is connected to the roof side 5 of the side structure 3. The roof rail assembly 10 includes the opening 15 formed by the transverse direction rail bodies 11 and the longitudinal direction rail bodies 13.

The fixed roof panel 70, from which the area corresponding to the opening 15 has been removed, is joined to the entire roof side 5 and the second section 22 of the roof rail assembly 10 by welding.

The first closed cross-section 33 is formed between at least one concave forming part 31 provided in the second section 22 and the fixed roof panel 70.

The removable roof panel 50 including the lower panel 51 and the upper panel 53 bonded to each other to form the second closed cross-section 55 is provided. The sealing member 90 is connected to the edge portion of the removable roof panel 50.

The removable roof panel 50 is connected to the first section 21 of the roof rail assembly 10 by at least one weld nut 57 and at least one engage bolt 59. The opening 15 of the roof rail assembly 10 is closed by the removable roof panel 50.

The at least one engage bolt 59 is engaged to the at least one weld nut 57 inside the vehicle body 1. Accordingly, the removable roof panel 50 may be mounted on the first section 21.

Figure 7A:
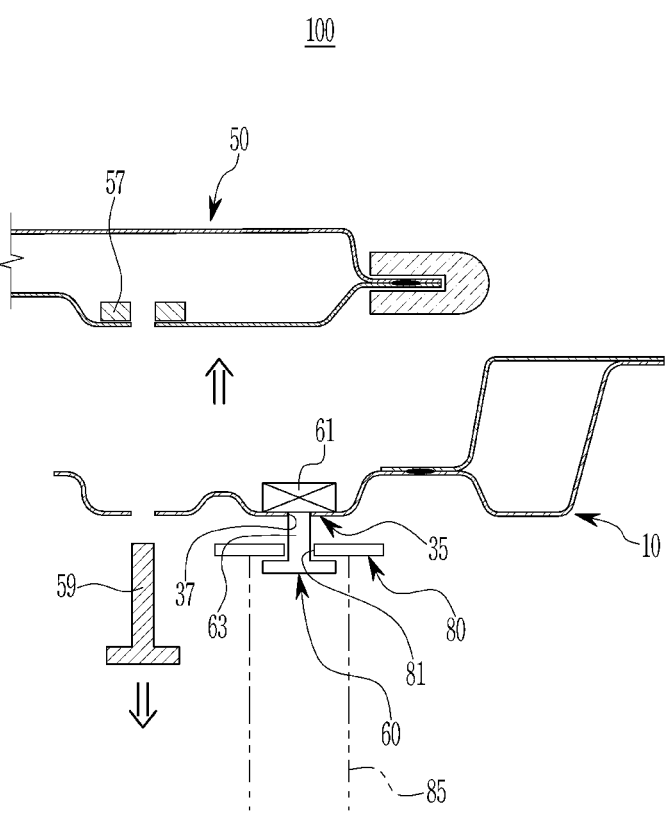
FIG. 7A to FIG. 9B are drawings for explaining an operation of the vehicle roof structure according to an exemplary embodiment.
Figure 7B:
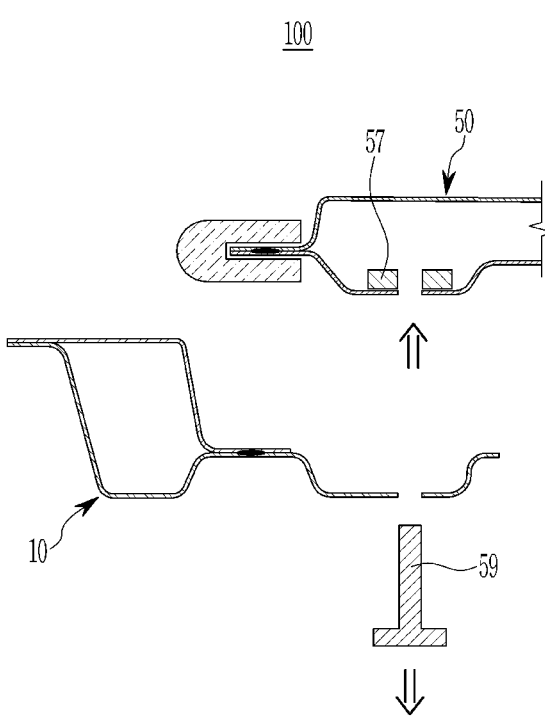
Figure 8A:
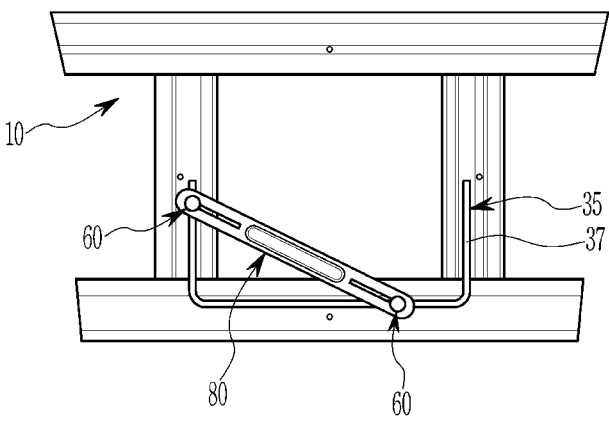
Figure 8B:
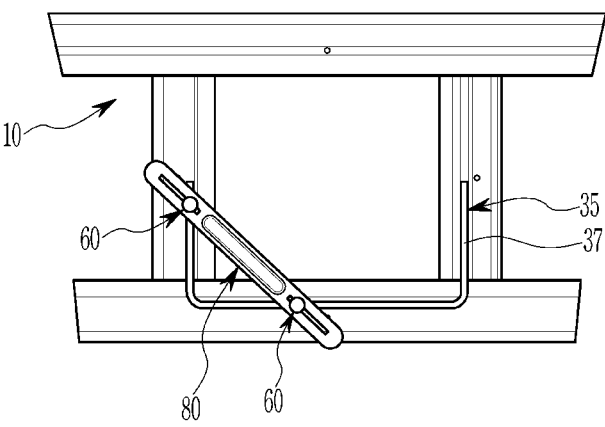
Figure 9A:
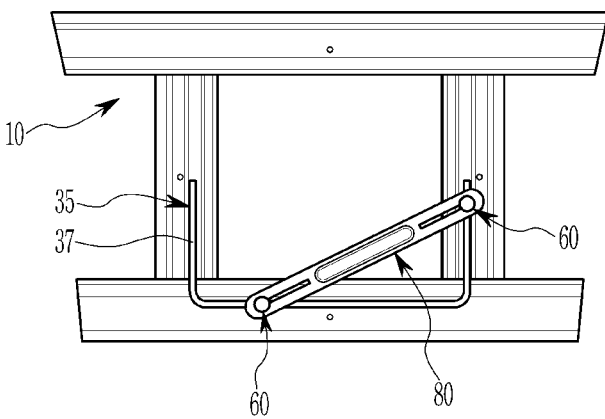
Figure 9B:
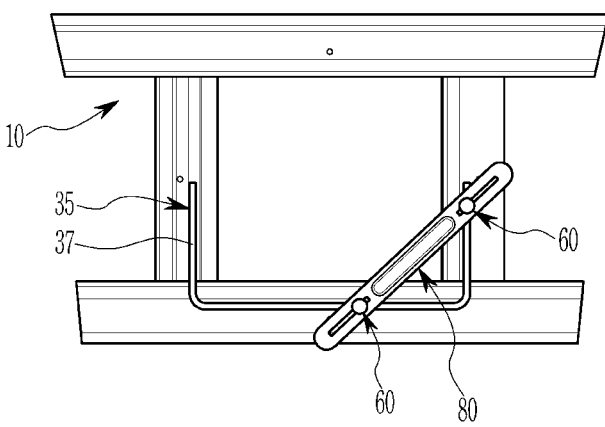

As shown in FIG. 7A and FIG. 7B, the at least one engage bolt 59 is separated from the at least one weld nut 57 inside the vehicle body 1. Accordingly, the removable roof panel 50 is separated from the first section 21, and the opening 15 of the roof rail assembly 10 can be opened.

The pair of bearing assemblies 60 is slidably installed on the guide rail portion 35 of the roof rail assembly 10 through the rail slot 37.

The link member 80 is rotatably coupled to the link pin 63 of the pair of bearing assemblies 60. The link pin 63 is slidably connected to the pair of link slots 81 of the link member 80. The UX product 85 such as a display device is mounted on the link member 80.

As shown in FIG. 8A to FIG. 9B, the link member 80 can be moved to various positions along the guide rail portion 35 and the rail slot 37 through the pair of bearing assemblies 60. Accordingly, the occupant can move the UX product 85 (see FIG. 4) to various positions.

As the removable roof panel 50 is applied to the roof structure 100 of a vehicle according to an embodiment of the present invention, it is possible to provide occupants with a sense of openness of the interior with a simple configuration.

In addition, since the roof structure 100 of the vehicle according to an exemplary embodiment may move the UX product 85 to various positions through a simple link connection structure inside the vehicle body 1, various conveniences may be provided to the occupants.

Therefore, since the roof structure 100 of a vehicle according to an exemplary embodiment may provide occupants with an open feeling of the interior and various conveniences with a simple configuration, the marketability of the vehicle can be improved and manufacturing costs can be reduced.

Furthermore, as the roof structure 100 of the vehicle according to an exemplary embodiment applies the roof rail assembly 10 extending along the lateral and longitudinal directions, the ceiling strength and the strength of the frame of the vehicle body 1 may be secured.

In addition, the roof structure 100 of the vehicle according to an exemplary embodiment may enhance cross-section connectivity and bonding strength by the cross-section connection structure of the roof rail assembly 10, the removable roof panel 50, and the fixed roof panel 70.

Furthermore, the vehicle roof structure 100 according to an exemplary embodiment may improve connectivity, strength, durability, impact absorption, and NVH performance of the vehicle body 1.

While embodiments of this invention have been described in connection with what is presently considered to be practical exemplary embodiments, it is to be understood that the embodiments of the invention are not limited to the disclosed embodiments. On the contrary, they are intended to cover various modifications and equivalent arrangements included within the spirit and scope of the appended claims.

What is claimed is:

1. A roof structure for a vehicle, the roof structure comprising:
   a roof rail assembly configured to be connected to side structures disposed on both sides of a vehicle body, the roof rail assembly comprising an opening defined therein;
   a guide rail portion provided along a predetermined section of the roof rail assembly;
   a rail slot in the guide rail portion;
   a removable roof panel detachably provided in a first section of an area of the roof rail assembly, the first section comprising an edge region of the opening; and
   a fixed roof panel connected to a second section of the area, the second section being outside the first section wherein the roof rail assembly comprises a concave forming part in the second section.

2. The roof structure of claim 1, wherein:
   the second section is connected with the fixed roof panel by a weld; and
   a first closed cross-section is defined between the concave forming part and the fixed roof panel.

3. The roof structure of claim 1, wherein the removable roof panel comprises:
   a lower panel engaged with the first section; and an upper panel connected by a weld to the lower panel to define a second closed cross-section.

4. The roof structure of claim 3, further comprising a weld nut in the lower panel, wherein the weld nut engages with an engage bolt that penetrates the first section.

5. The roof structure of claim 1, wherein the roof rail assembly comprises:

a pair of transverse direction rail bodies connected to the side structures along a vehicle width direction; and a pair of longitudinal direction rail bodies connected to the pair of transverse direction rail bodies along a front to rear direction of the vehicle body.

6. The roof structure of claim 5, wherein the roof rail assembly defines the opening between the pair of transverse direction rail bodies and the pair of longitudinal direction rail bodies.

7. The roof structure of claim 1, further comprising a sealing member connected to an edge portion of the removable roof panel to seal between the removable roof panel and the fixed roof panel.

8. A roof structure for a vehicle, the roof structure comprising:

a roof rail assembly configured to be connected to side structures disposed on both sides of a vehicle body, the roof rail assembly comprising an opening defined therein;

a guide rail portion provided along a predetermined section of the roof rail assembly;

a rail slot in the guide rail portion;

a removable roof panel detachably provided in a first section of an area of the roof rail assembly, wherein the first section comprises an edge region of the opening; and a fixed roof panel connected to a second section of the area, the second section being outside the first section.

9. The roof structure of claim 8, further comprising:

a pair of bearing assemblies provided on the guide rail portion and configured to slide through the rail slot; and a link member rotatably connected to the pair of bearing assemblies, respectively.

10. The roof structure of claim 9, wherein the link member comprises a pair of link slots spaced apart from each other along a length direction to allow the pair of bearing assemblies to move in a slidable manner.

11. The roof structure of claim 9, wherein the link member is equipped with a user experience product.

12. The roof structure of claim 8, wherein the guide rail portion and the rail slot are provided in a front or a rear portion of the roof rail assembly along a front to rear direction of the vehicle body.

13. The roof structure of claim 8, further comprising a sealing member connected to an edge portion of the removable roof panel to seal between the removable roof panel and the fixed roof panel.

14. A vehicle comprising:

a vehicle body;

a pair of side structures coupled to both sides of the vehicle body, respectively, the pair of side structures extending in a front to rear direction of the vehicle body;

a roof rail assembly connected to upper portions of each of the pair of side structures, wherein an opening is defined in the roof rail assembly;

a guide rail portion provided along a predetermined section of the roof rail assembly;

a rail slot in the guide rail portion;

a removable roof panel detachably provided in a first section of an area of the roof rail assembly, the first section comprising an edge region of the opening; and a fixed roof panel connected to a second section of the area, the second section being outside the first section.

15. The vehicle of claim 14, wherein:

the roof rail assembly comprises a concave forming part in the second section;

the second section is connected with the fixed roof panel by a weld; and a first closed cross-section is defined between the concave forming part and the fixed roof panel.

16. The vehicle of claim 14, wherein the removable roof panel comprises:

a lower panel engaged with the first section; and an upper panel connected by a weld to the lower panel to define a second closed cross-section.

17. The vehicle of claim 16, further comprising:

a weld nut in the lower panel; and an engage bolt penetrating the first section, wherein the weld nut is engaged with the engage bolt.

18. The vehicle of claim 14, wherein the roof rail assembly comprises:

a pair of transverse direction rail bodies connected to the side structures along a vehicle width direction; and a pair of longitudinal direction rail bodies connected to the pair of transverse direction rail bodies along the front to rear direction of the vehicle body, wherein the opening is defined between the pair of transverse direction rail bodies and the pair of longitudinal direction rail bodies.

19. The vehicle of claim 14, further comprising a sealing member connected to an edge portion of the removable roof panel to seal between the removable roof panel and the fixed roof panel.

* * * * *